(12) United States Patent
Ohnami et al.

(10) Patent No.: US 6,255,006 B1
(45) Date of Patent: *Jul. 3, 2001

(54) MAGNETIC RECORDING MEDIUM

(75) Inventors: Kazunori Ohnami; Hiroshi Kanazawa; Hiroshi Sakai, all of Chiba (JP)

(73) Assignee: Showa Denko Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,916

(22) Filed: Jan. 8, 1999

Related U.S. Application Data

(60) Provisional application No. 60/083,584, filed on Apr. 30, 1998.

(30) Foreign Application Priority Data

Jan. 12, 1998 (JP) .................................................. 10-004274

(51) Int. Cl.$^7$ ........................................................ G11B 5/66
(52) U.S. Cl. ........................... 428/694 TS; 428/617; 428/621; 428/661; 428/662; 428/663; 428/664; 428/665; 428/666; 428/667; 428/678; 428/694 TC; 428/694 TP; 428/697; 428/699; 428/900; 428/928

(58) Field of Search ........................ 428/694 TS, 694 TP, 428/694 TC, 697, 699, 617, 621, 661, 662, 663, 664, 665, 666, 667, 678, 900, 928

(56) References Cited

U.S. PATENT DOCUMENTS 4,833,020    5/1989   Shiroishi et al. .
5,356,522 *  10/1994  Lal et al. .

FOREIGN PATENT DOCUMENTS 582 412   2/1994   (EP) .
751 501   1/1997   (EP) .

* cited by examiner

*Primary Examiner*—Bernard Pianalto
(74) *Attorney, Agent, or Firm*—Sughrue, Mion, Zinn, Macpeak & Seas, PLLC

(57) ABSTRACT

A magnetic recording medium comprising a non-magnetic substrate having thereon a non-magnetic undercoat, a magnetic film and optionally a protective film. The magnetic film comprises a material containing Co as a main component. The non-magnetic undercoat comprises at least two layers including a first undercoat film and a second undercoat film provided on the first undercoat film. The first undercoat film comprises a material containing Cr as a main component, and the second undercoat film comprises a material selected from the group consisting of a Cr/Nb-base alloy, a Cr/W-base alloy, a Cr/V-base alloy and a Cr/Mo-base alloy as a main component.

18 Claims, 9 Drawing Sheets

MAGNETIC RECORDING MEDIUM

CROSS REFERENCE TO RELATED APPLICATIONS

This application is an application filed under 35 U.S.C. §111(a) claiming benefit pursuant to 35 U.S.C. §119(e)(1) of the filing date of the Provisional Application 60/083,584 filed Apr. 30, 1998 pursuant to 35 U.S.C. §111(b).

FIELD OF THE INVENTION

The present invention relates to a magnetic recording medium such as a magnetic drum, a magnetic tape and a magnetic disc. More specifically, the present invention relates to a magnetic recording medium having excellent noise properties and high coercivity.

BACKGROUND OF THE INVENTION

In recent years, magnetic disc devices or the like have tended toward higher densities, and accompanying this, a magnetic head based on a high magnetic resistance effect (hereinafter referred to as a "MR head") has been used in many cases. To accommodate such magnetic disc devices, the magnetic recording medium must also exhibit excellent magnetic properties such as low noise.

This is because the MR head has high read sensitivity and low head noise as compared with conventional magneto-electric induction type heads. For improving the properties of the magnetic disc device and the like, such as S/N ratio and recording density, the magnetic recording medium must also have excellent magnetic properties such as low noise properties.

The magnetic recording medium commonly used at present comprises a substrate comprising an Al alloy having formed thereon an NiP plating film, a non-magnetic undercoat film comprising Cr or the like formed on the substrate, a magnetic film comprising a material containing Co as a main component formed on the undercoat film, and a protective film and a lubricant film formed thereon.

This kind of magnetic recording medium is disclosed in JP-B-5-24564 (the term "JP-B" as used herein means an "examined Japanese patent publication"). The magnetic recording medium disclosed in this patent publication exhibits improved squareness by providing a non-magnetic undercoat film comprising Cr and having a thickness of from 50 to 200 Å.

Furthermore, JP-A-1-232522 (the term "JP-A" as used herein means an "unexamined published Japanese patent application") proposes a magnetic recording medium including a non-magnetic undercoat film comprising an alloy obtained by adding one or more metals selected from Cu, Nb, Ti, V, Zr, Mo, Zn, W and Ta to Cr and having a thickness of from 500 to 3,000 Å, to thereby improve magnetic properties, particularly coercivity.

However, in the magnetic recording medium disclosed in JP-B-5-24564, the thickness of the non-magnetic undercoat film comprising Cr is small and accordingly, the crystals growing in this undercoat film are not sufficiently oriented toward the (200) direction. As a result, orientation of the crystals within the magnetic film, which epitaxially grow on the undercoat film, is disordered and the magnetic recording medium thus obtained disadvantageously fails to provide satisfactory magnetic properties such as coercivity.

In the magnetic recording medium disclosed in JP-A-1-232522, the thickness of the non-magnetic undercoat film comprising a Cr alloy is large and at the time of forming the film, bulking of crystals comprising a Cr alloy takes place within the film. In turn, magnetic grains within the magnetic film formed on the non-magnetic undercoat film are bulked due to epitaxial growth on the non-magnetic undercoat film comprising the bulked Cr alloy crystals. As a result, the magnetic recording medium thus obtained disadvantageously has deteriorated magnetic properties such as deteriorated noise properties.

The present invention has been achieved in view of the above problems of the prior art.

SUMMARY OF THE INVENTION

It is therefore an objective of the present invention to provide a magnetic recording medium having both high coercivity and excellent noise properties.

The above object of the present invention is attained by providing a magnetic recording medium comprising a non-magnetic substrate having thereon a non-magnetic undercoat and a magnetic film, said magnetic film comprising a material containing Co as a main component, said non-magnetic undercoat comprising at least two layers including a first undercoat film and a second undercoat film provided on said first undercoat film, said first undercoat film comprising a material containing Cr as a main component, and said second undercoat film comprising a material selected from the group consisting of a Cr/Nb-base alloy, a Cr/W-base alloy, a Cr/V-base alloy and a Cr/Mo-base alloy as a main component.

When the second undercoat film comprises a material containing a Cr/Nb-base alloy as a main component, the Nb content of the second undercoat film is preferably from 5 to 20 at %.

When the second undercoat film comprises a material containing a Cr/W-base alloy as a main component, the W content of the second undercoat film is preferably from 5 to 60 at %, more preferably from 3 to 60 at %.

When the second undercoat film comprises a material containing a Cr/V-base alloy as a main component, the V content of the second undercoat film is preferably from 2 to 30 at %.

When the second undercoat film comprises a material containing a Cr/Mo-base alloy as a main component, the Mo content of the second undercoat film is preferably from 2 to 25 at %.

The first undercoat film preferably has a thickness of from 25 to 600 Å, and the second undercoat film preferably has a thickness of from 1 to 200 Å.

The non-magnetic substrate preferably comprises glass or an aluminum alloy h having a NiP plating layer applied to the surf ace thereof.

DESCRIPTION OF THE PREFERRED EMBODIMENTS

Figure 1:
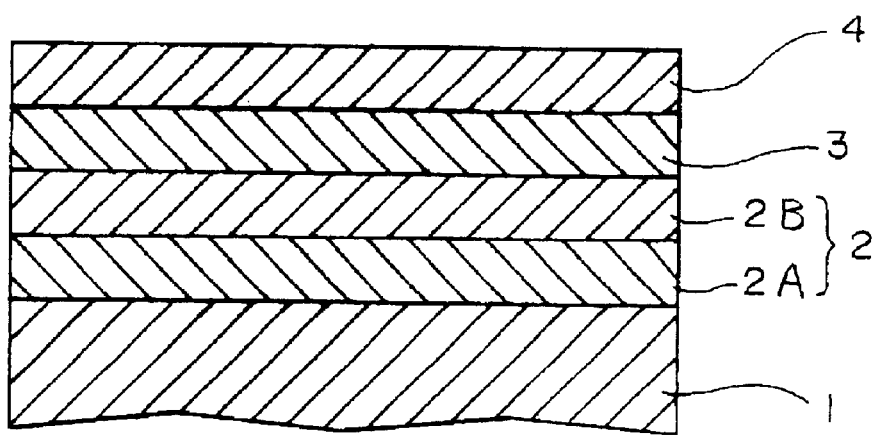
FIG. 1 is a partial cross section showing one practical embodiment of the magnetic recording medium according to the present invention.

FIG. 1 shows one practical embodiment of the magnetic recording medium of the present invention. In the magnetic recording medium shown in FIG. 1, a non-magnetic undercoat 2, a magnetic film 3 and a protective film 4 are sequentially formed on a non-magnetic substrate 1. The non-magnetic undercoat 2 has two-layer structure such that a second undercoat film 2B is formed on a first undercoat film 2A.

The non-magnetic substrate 1 may comprise glass, ceramic, carbon, silicon or silicon carbide, in addition to a NiP-plated Al alloy, namely, an Al alloy having applied to the surface thereof a NiP plating layer, which is commonly used as a substrate for magnetic recording media.

In particular, the substrate preferably comprises a NiP-plated Al alloy or glass. The NiP-plated alloy is advantageous in that it is inexpensive and the production cost of the magnetic recording medium can be reduced. Glass is advantageous in that it has excellent surface smoothness and the magnetic recording medium thus obtained can have excellent CSS properties.

The surface of the non-magnetic substrate 1 is preferably subjected to texturing treatment so as to have an average surface roughness Ra of 20 Å or less. If the average surface roughness Ra exceeds 20 Å, the magnetic recording medium disadvantageously has deteriorated glide height properties.

The first undercoat film 2A of the non-magnetic undercoat 2 is selected so as to achieve good crystal orientation in the second undercoat film 2B, and comprises a material containing Cr as a main component. The term "main component" as used herein means that the material of the first undercoat film 2A comprises Cr in a ratio of 50 at % or more, preferably 70 at % or more.

The first undercoat film 2A preferably has a thickness of from 25 to 600 Å.

If this thickness is less than 25 Å, the crystals within the film 2A grow insufficiently. As a result, orientation of the crystals in the second undercoat film 2B, which epitaxially grow on the film 2A, and orientation of the crystals in the magnetic film 3, which epitaxially grow on the film 2B, are deteriorated and the magnetic recording medium thus obtained has reduced magnetic properties such as reduced coercivity.

If the above-described thickness exceeds 600 Å, bulking of crystals growing in the film 2A occurs to cause in turn bulking of crystals growing in the second undercoat film 2B and in the magnetic film 3. As a result, the magnetic recording medium thus obtained has reduced magnetic properties such as reduced noise properties.

The thickness of the undercoat film 2A is more preferably from 25 to 300 Å, so that good crystal orientation can be achieved without causing bulking of crystals in the first undercoat film 2A. The resulting magnetic recording medium can have higher coercivity and more excellent noise properties.

The second undercoat film 2B comprises a material containing any one of a Cr/Nb-base alloy, a Cr/W-base alloy, a Cr/V-base alloy and a Cr/Mo-base alloy as a main component. The term "main component" as used herein means that the material of the second undercoat film 2B comprises the component (Cr/Nb, Cr/W, Cr/V, Cr/Mo) in a ratio of 50 at % or more, preferably 80 at % or more.

When the second undercoat film 2B comprises a material containing a Cr/Nb-base alloy as a main component, the Nb content of the second undercoat film 2B is preferably from 5 to 20 at %. If the Nb content is less than 5 at % or exceeds 20 at %, the magnetic recording medium thus obtained has deteriorated magnetic properties such as deteriorated coercivity and noise properties.

When the second undercoat film 2B comprises a material containing a Cr/W-base alloy as a main component, the W content of the second undercoat film 2B is preferably from 5 to 60 at %. If the W content is less than 5 at % or exceeds 60 at %, the magnetic recording medium thus obtained has deteriorated magnetic properties such as deteriorated coercivity and noise properties.

The W content is more preferably from 30 to 60 at %, so that the magnetic properties can be further improved.

When the second undercoat film 2B comprises a material containing a Cr/V-base alloy as a main component, the V content of the second undercoat film 2B is preferably from 2 to 30 at %. If the V content is less than 2 at % or exceeds 30 at %, the magnetic recording medium thus obtained has deteriorated magnetic properties such as deteriorated coercivity and noise properties.

When the second undercoat film 2B comprises a material containing a Cr/Mo-base alloy as a main component, the Mo content of the second undercoat film 2B is preferably from 2 to 25 at %. If this content is less than 2 at % or exceeds 25 at %, the magnetic recording medium thus obtained has deteriorated magnetic properties such as deteriorated coercivity and noise properties.

The second undercoat film 2B preferably has a thickness of from 1 to 200 Å.

If the thickness of the second undercoat film is less than 1 Å, the crystals within the film 2B grow insufficiently. As a result, orientation of the crystals in the magnetic film 3 formed on the film 2B is deteriorated, and the magnetic recording medium thus obtained has reduced magnetic properties such as reduced coercivity.

If the thickness of the second undercoat film exceeds 200 Å, bulking of crystals growing in the film 2B occurs to cause in turn bulking of the crystals growing in the magnetic film 3. As a result, the magnetic recording medium thus obtained has reduced magnetic properties such as reduced noise properties.

The magnetic film 3 comprises a material containing Co as a main component, preferably in an amount of 50 at % or more. Examples of this material include those containing an alloy of Co with one or more of Cr, Pt, Ta, B, Ti, Ag, Cu, Al, Au, W and Mo.

Specific useful examples of the magnetic film material include materials containing a Co/Cr/Ta, Co/Cr/Pt or Co/Cr/Pt/Ta-base alloy as a main component (see, for example, U.S. Pat. No. 5,569,533, incorporated herein by reference). Of these, materials comprising a Co/Cr/Pt/Ta-base alloy are preferred.

The magnetic film 3 preferably has a thickness of from 150 to 400 Å.

The protective film 4 may comprise carbon, silicon oxide or silicon nitride. The thickness thereof is preferably from 50 to 200 Å.

A lubricant film comprising a perfluoropolyether may be provided on the protective film 4.

In the above-described magnetic recording medium, the magnetic film 3 comprises a material containing Co as a main component, the non-magnetic undercoat 2 has a two-layer structure such that a second undercoat film 2B is formed on a first undercoat film 2A, the first undercoat film 2A comprises a material containing Cr as a main component, and the second undercoat film 2B comprises a material containing any one of a Cr/Nb-base alloy, a Cr/W-base alloy, a Cr/V-base alloy and Cr/Mo-base alloy as a main component. Due to this constitution, a magnetic recording medium having both high coercivity and excellent noise properties can be obtained.

The reason why the effect of improving magnetic properties can be obtained by the above-described constitution is not known, but is considered to arise as follows.

The non-magnetic undercoat 2 has a two-layer structure such that a second undercoat film 2B is formed on a first undercoat film 2A, and the first undercoat film 2A comprises a material containing Cr as a main component. As a result, the crystals in the second undercoat film 2B comprising any one of the above-described four kinds of Cr alloys and formed on the film 2A epitaxially grow on the film 2A to provide good orientation.

Accordingly, the thickness of the second undercoat film 2B can be reduced to an extent such that the crystal orientation is not disordered.

Combined with this, because the second undercoat film 2B comprises any one of the above-described four kinds of Cr alloys, the lattice constant of the crystals in the film 2B approximates the lattice constant of the crystals growing in the magnetic film 3 comprising a material containing Co as a main component.

In this manner, the crystals in the second undercoat film 2B can have good orientation without causing bulking and moreover, the lattice constant thereof approximates that of the crystals in the magnetic film 3. As a result, the crystals in the magnetic film 3 epitaxially growing on the film 2B can have good orientation without causing bulking, and the magnetic recording medium can have both high coercivity and excellent noise properties.

In the above-described practical embodiment, the non-magnetic undercoat 2 has a two-layer structure such that a second undercoat film 2B is formed on a first undercoat film 2A. However, the magnetic recording medium of the present invention is by no means limited thereto, and the non-magnetic undercoat 2 may have, for example, a three-layer structure by forming one or a plurality of films on the lower layer side of the first undercoat film 2A.

EXAMPLES

Examples of the present invention are described below, however, the present invention should not be construed as being limited thereto.

Examples 1 to 4

Magnetic recording media having the structure shown in FIG. 1 were manufactured as follows.

A NiP-plated Al substrate 1 subjected to texturing to a surface roughness Ra of 15 Å was heated to a temperature of 220° C. and housed in a chamber in a DC magnetron sputtering apparatus (3100, manufactured by Anelba). After setting the ultimate vacuum within the chamber to $2 \times 10^{-7}$ Torr, a first undercoat film 2A made of Cr was formed on the non-magnetic substrate 1 to a thickness of 100 Å using a Cr target. It is to be understood, however, that the target material and hence the undercoat film 2A could contain elements in addition to Cr as long as the material contains Cr as a main component.

On the first undercoat film 2A, a second undercoat film 2B made of a Cr/Nb-base alloy was formed to a thickness of 150 Å using a target having the same alloy composition.

Four kinds of Cr/Nb-base alloys each comprising Cr and Nb were used having a component ratio (at %) of $Cr_{95}Nb_5$, $Cr_{90}Nb_{10}$, $Cr_{80}Nb_{20}$ or $Cr_{75}Nb_{25}$ to prepare the magnetic media of Examples 1 to 4, respectively.

Thereafter, on the second undercoat film 2B, a magnetic film 3 comprising a Co/Cr/Pt/Ta-base alloy ($Co_{75}Cr_{16}Pt_6Ta_3$) was formed using a target having the same alloy composition.

Subsequently, a protective film 4 comprising carbon was formed on the magnetic film 3 to a thickness of 150 Å. The sputtering gas used in the operation above for forming the respective films was Ar and the pressure thereof was 3 mTorr.

The magnetic film 3 had a film thickness of 140 G$\mu$m in terms of its remnant magnetization film thickness product (BrT).

Comparative Example 1

A magnetic recording medium was manufactured in the same manner as in Examples 1 to 4, except for forming a second undercoat film 2B made of Cr in place of a Cr/Nb-base alloy.

The read/write properties of the magnetic recording media of Examples 1 to 4 and Comparative Example 1 were measured using a thin film magnetic head having a magnetic resistance (MR) to element in the read area, at a recording density of 148.5 KFCI. The measured parameters were SNR (signal to noise ratio) and noise. The coercivity of each magnetic recording medium was measured by vibrating sample magnetometry (VSM). The results obtained are shown in FIG. 2.

Figure 2:
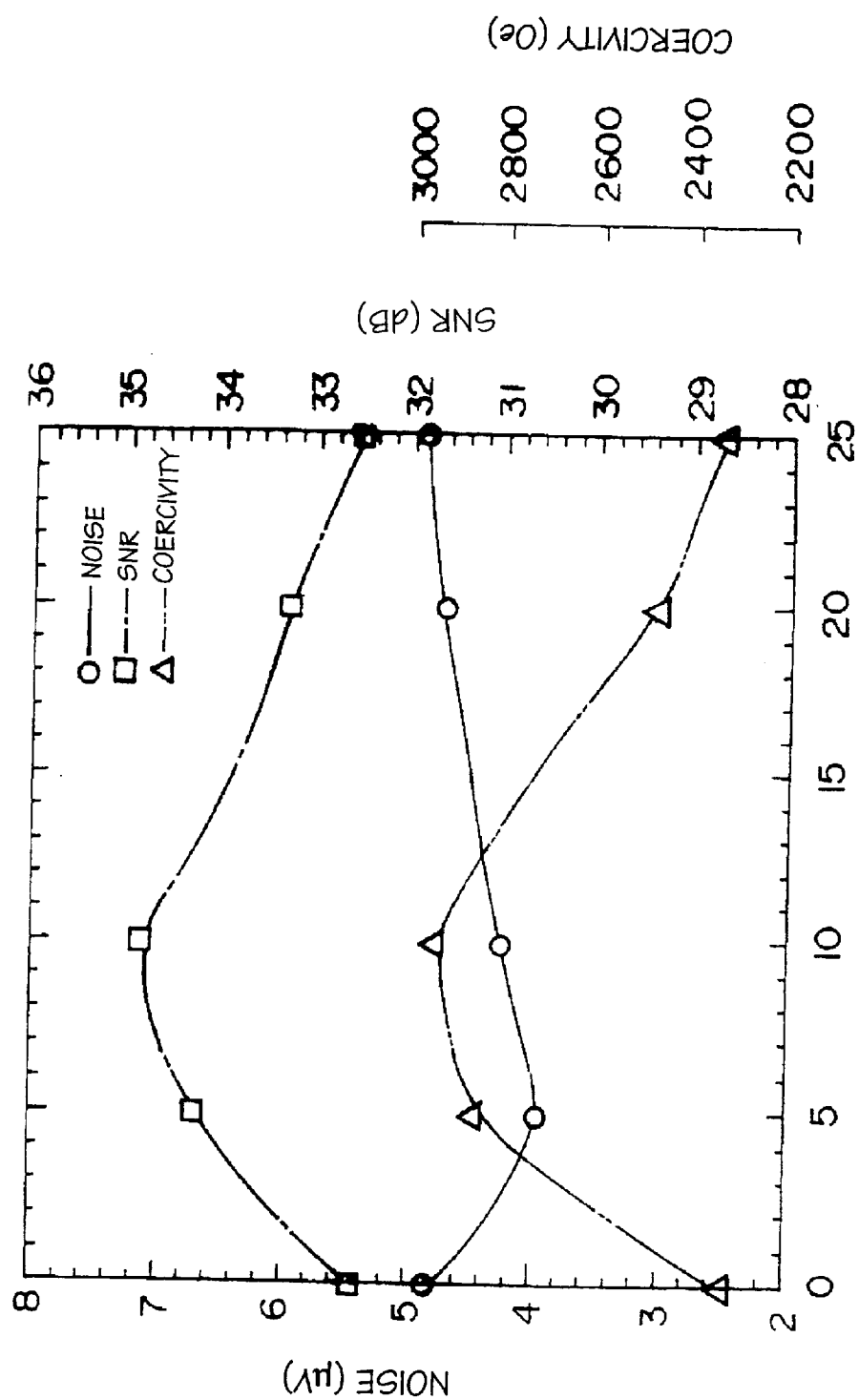
FIG. 2 is a graph showing test results.

In FIG. 2, the abscissa shows the Nb content of the second undercoat film 2B and the ordinate shows SNR (dB), noise ($\mu$V) or coercivity (Oe).

In FIG. 2, the case where the Nb content of the second undercoat film 2B is 0 at % is Comparative Example 1.

Examples 5 to 11

Magnetic recording media were manufactured in the same manner as in Examples 1 to 4, except for forming a second undercoat film 2B made of a Cr/W-base alloy.

Seven kinds of Cr/W-base alloys each comprising Cr and W were used having a component ratio (at %) of $Cr_{95}W_5$, $Cr_{85}W_{15}$, $Cr_{80}W_{20}$, $Cr_{65}W_{35}$, $Cr_{55}W_{45}$, $Cr_{45}W_{55}$ or $Cr_{35}W_{65}$ to prepare the magnetic media of Examples 5 to 11, respectively.

Comparative Example 2

A magnetic recording medium was manufactured in the same manner as in Examples 5 to 11, except for forming a second undercoat film 2B made of Cr in place of a Cr/W-base alloy.

The coercivity and read/write properties of the magnetic recording media manufactured in Examples 5 to 11 and Comparative Example 2 were measured in the same manner as in Examples 1 to 4. The results obtained are shown in FIG. 3.

Figure 3:
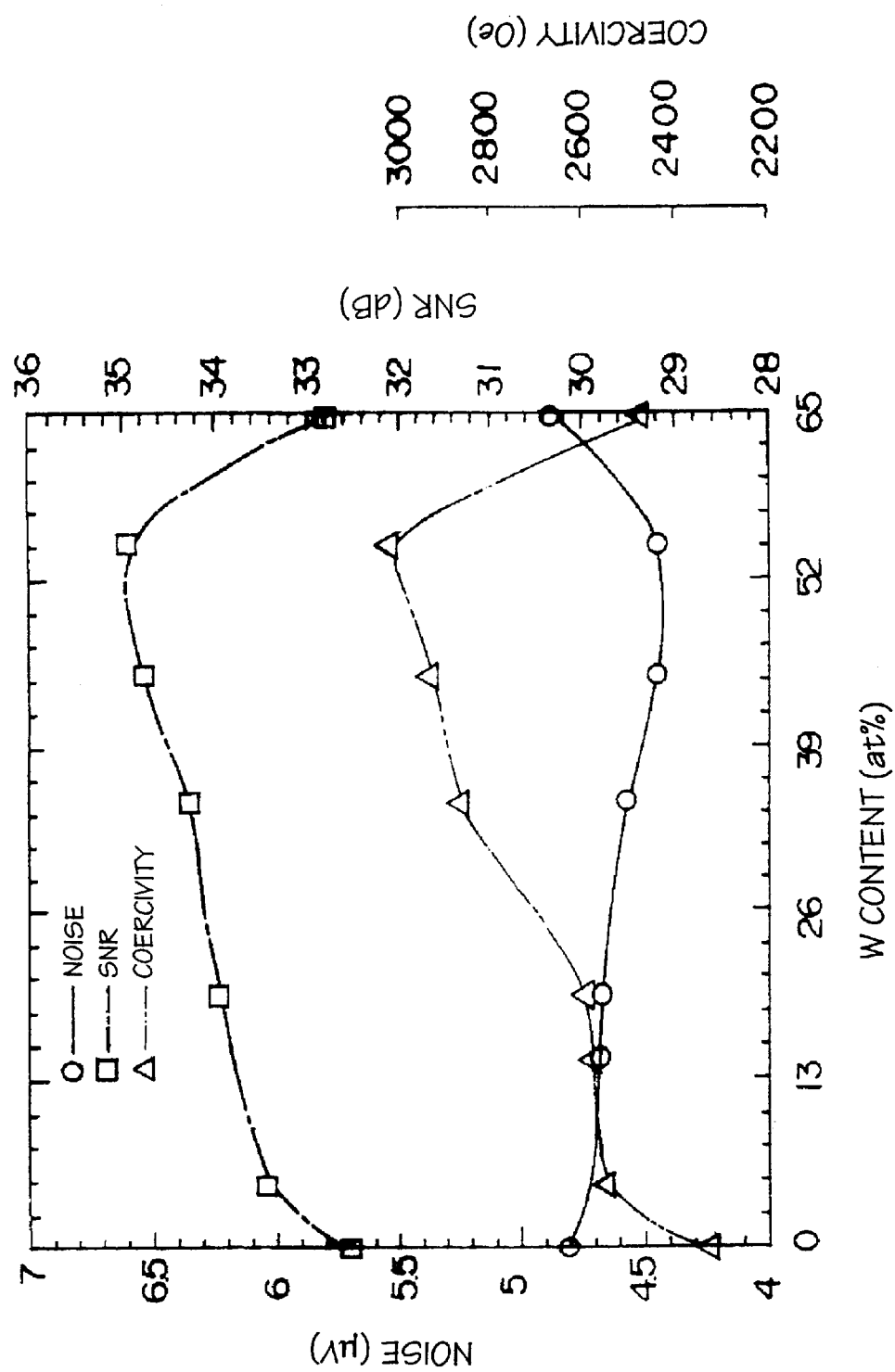
FIG. 3 is a graph showing test results.

In FIG. 3, the abscissa shows the W content of the second undercoat film 2B and the ordinate shows SNR (dB), noise ($\mu$V) or coercivity (Oe).

In FIG. 3, the case where the W content of the second undercoat film 2B is 0 at % is Comparative Example 2.

Examples 12 to 18

Magnetic recording media were manufactured in the same manner as in Examples 1 to 4, except for forming a second undercoat film 2B made of a Cr/V-base alloy.

Seven kinds of Cr/V-base alloys each comprising Cr and V were used having a component ratio (at %) of $Cr_{98}V_2$, $Cr_{94}V_6$, $Cr_{85}V_{15}$, $Cr_{80}V_{20}$ $Cr_{75}V_{25}$, $Cr_{70}V_{30}$ or $Cr_{65}V_{35}$ to prepare the magnetic media of Examples 12 to 18, respectively.

Comparative Example 3

A magnetic recording medium was manufactured in the same manner as in Examples 12 to 18, except for forming a second undercoat film 2B made of Cr in place of a Cr/V-base alloy.

The coercivity and read/write properties of the magnetic recording media manufactured in Examples 12 to 18 and Comparative Example 3 were measured in the same manner as in Examples 1 to 4. The results obtained are shown in FIG. 4.

Figure 4:
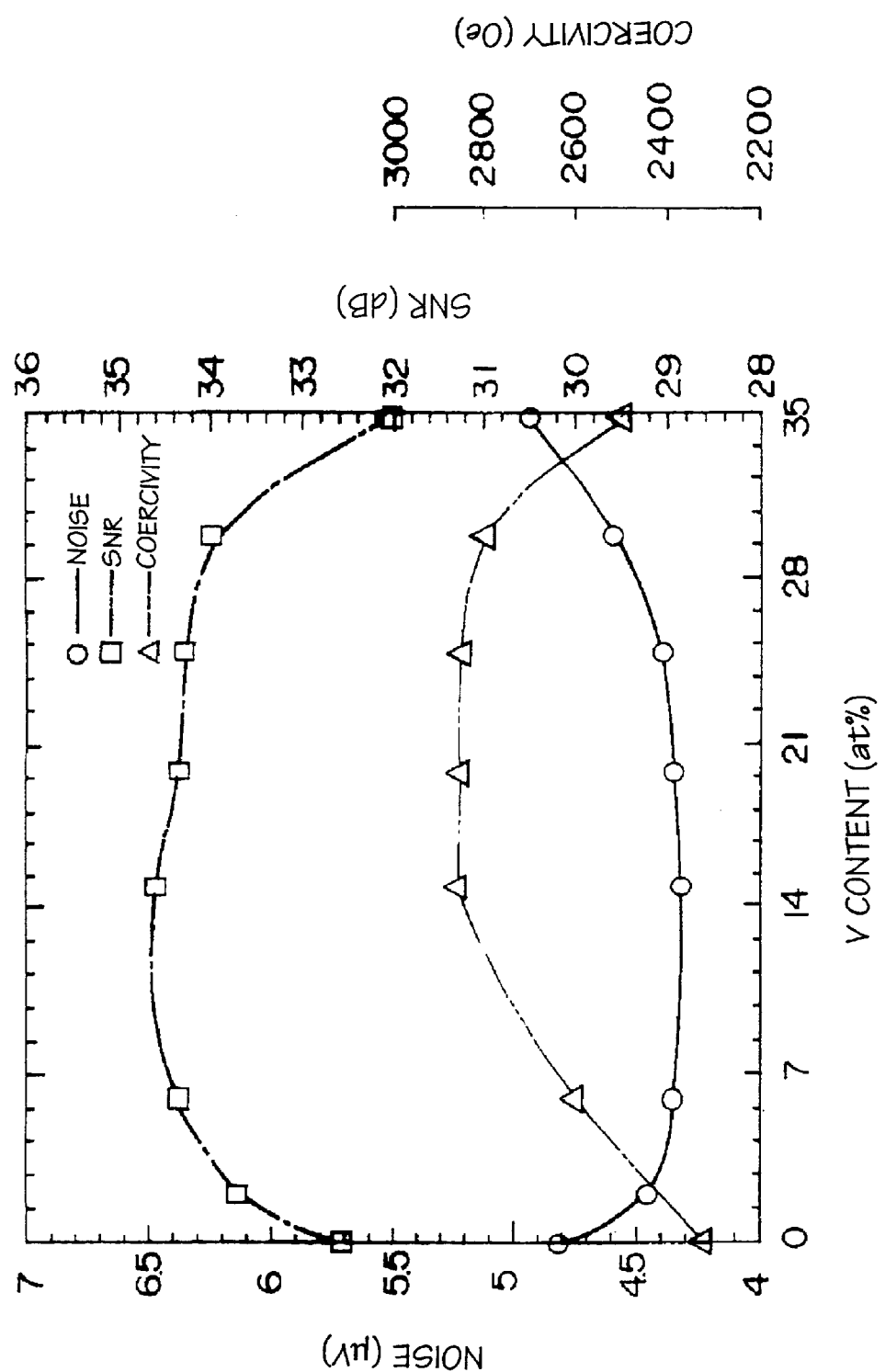
FIG. 4 is a graph showing test results.

In FIG. 4, the abscissa shows the V content of the second undercoat film 2B and the ordinate shows SNR (dB), noise ($\mu$V) or coercivity (Oe).

In FIG. 4, the case where the V content of the second undercoat film 2B is 0 at % is Comparative Example 3.

Examples 19 to 23

Magnetic recording media were manufactured in the same manner as in Examples 1 to 4, except for forming a second undercoat film 2B made of a Cr/Mo-base alloy.

Seven kinds of Cr/Mo-base alloys each comprising Cr and Mo were used having a component ratio (at %) of $Cr_{95}Mo_5$, $Cr_{90}Mo_{10}$, $Cr_{85}Mo_{15}$, $Cr_{80}Mo_{20}$ or $Cr_{75}Mo_{25}$ to prepare the magnetic media of Examples 19 to 23, respectively.

Comparative Example 4

A magnetic recording medium was manufactured in the same manner as in Examples 19 to 23, except for forming a second undercoat film 2B made of Cr in place of a Cr/Mo-base alloy.

The coercivity and read/write properties of the magnetic recording media manufactured in Examples 19 to 23 and Comparative Example 4 were measured in the same manner as in Examples 1 to 4. The results obtained are shown in FIG. 5.

Figure 5:
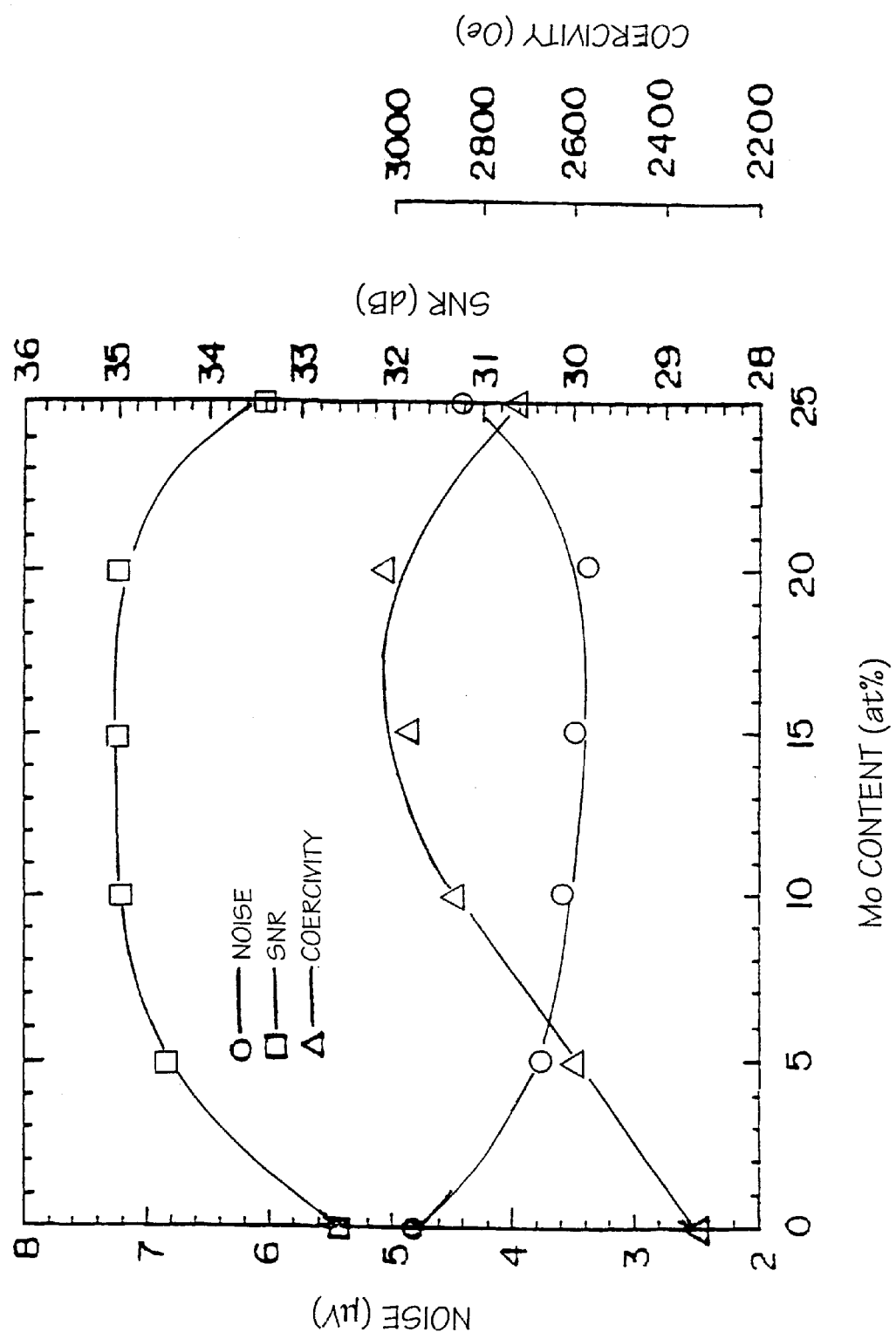
FIG. 5 is a graph showing test results.

In FIG. 5, the abscissa shows the Mo content of the second undercoat film 2B and the ordinate shows SNR (dB), noise ($\mu$V) or coercivity (Oe).

In FIG. 5, the case where the Mo content of the second undercoat film 2B is 0 at % is Comparative Example 4.

Examples 24 to 27

Magnetic recording media were manufactured by forming a second undercoat film 2B made of a Cr/Nb-base alloy (component ratio: $Cr_{95}Nb_5$), a Cr/W-base alloy (component ratio: $Cr_{85}W_{15}$), a Cr/V-base alloy (component ratio: $Cr_{85}V_{15}$) or a Cr/Mo-base alloy (component ratio: $Cr_{85}Mo_{15}$) to a thickness of 150 Å.

Comparative Examples 5 to 8

Magnetic recording media were manufactured in the same manner as in Examples 24 to 27, except for not forming a first undercoat film 2A.

The coercivity and read/write properties of the magnetic recording media manufactured in Examples 24 to 27 and Comparative Examples 5 to 8 were measured in the same manner as in Examples 1 to 4. The results obtained are shown in Table 1.

TABLE 1

| | Non-Magnetic Undercoat Film | Noise ($\mu$V) | SNR (dB) |
|---|---|---|---|
| Example 24 | 2-layer structure | 3.93 | 34.3 |
| Comparative Example 5 | single layer structure | 5.01 | 32.4 |
| Example 25 | 2-layer structure | 4.77 | 33.3 |
| Comparative Example 6 | single layer structure | 4.88 | 32.2 |
| Example 26 | 2-layer structure | 4.51 | 34.5 |
| Comparative Example 7 | single layer structure | 4.79 | 32.7 |
| Example 27 | 2-layer structure | 3.55 | 35.0 |
| Comparative Example 8 | single layer structure | 4.65 | 33.0 |

Examples 28 to 31

Magnetic recording media were manufactured in the same manner as in Examples 1 to 4, except for forming a first undercoat film 2A to a thickness of 200 Å and a second undercoat film 2B to a thickness of 30 Å.

Four kinds of Cr/Nb-base alloys each comprising Cr and Nb were used having a component ratio (at %) of $Cr_{95}Nb_5$, $Cr_{90}Nb_{10}$, $Cr_{80}Nb_{20}$ or $Cr_{75}Nb_{25}$ to prepare the magnetic media of Examples 28 to 31, respectively.

Comparative Example 9

A magnetic recording medium was manufactured in the same manner as in Examples 28 to 31, except for forming a second undercoat film 2B made of Cr in place of a Cr/Nb-base alloy.

The read/write properties of the magnetic recording media of Examples 28 to 31 and Comparative Example 9 were measured in the same manner as in Examples 1 to 4. The results obtained are shown in FIG. 6.

Figure 6:
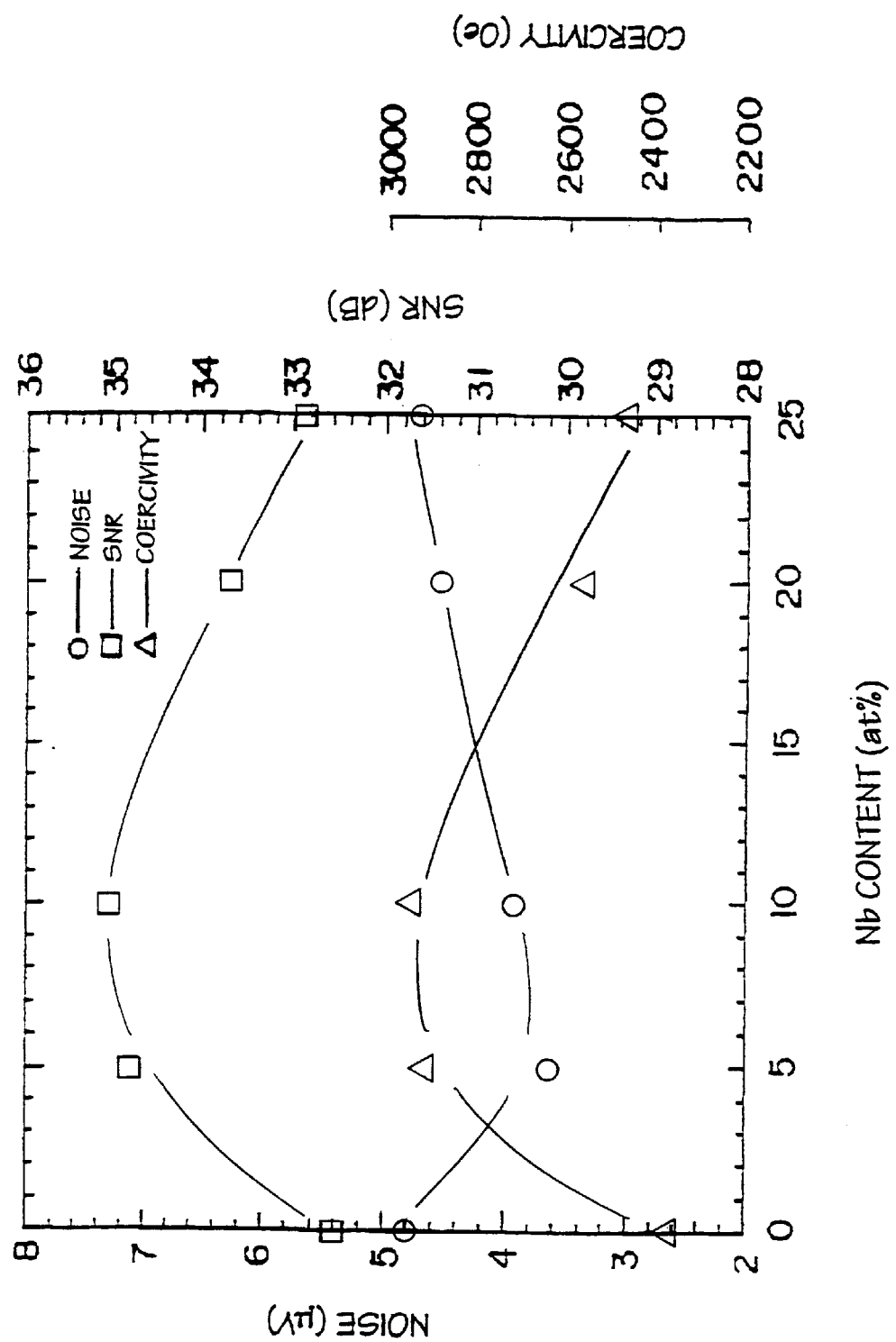
FIG. 6 is a graph showing test results.

In FIG. 6, the abscissa shows the Nb content of the second undercoat film 2B and the ordinate shows SNR (dB), noise ($\mu$V) or coercivity (Oe).

In FIG. 6, the case where the Nb content of the second undercoat film 2B is 0 at % is Comparative Example 9.

Examples 32 to 38

Magnetic recording media were manufactured in the same manner as in Examples 28 to 31, except for forming a second undercoat film 2B made of a Cr/W-base alloy.

Seven kinds of Cr/W-base alloys each comprising Cr and W were used having a component ratio of $Cr_{95}W_5$, $Cr_{85}W_{15}$, $Cr_{80}W_{20}$, $Cr_{65}W_{35}$, $Cr_{55}W_{45}$, $Cr_{45}W_{55}$ or $Cr_{35}W_{65}$ to prepare the magnetic media of Examples 32 to 38, respectively.

Comparative Example 10

A magnetic recording medium was manufactured in the same manner as in Examples 32 to 38, except for forming a second undercoat film 2B made of Cr in place of a Cr/W-base alloy.

The coercivity and read/write properties of the magnetic recording media manufactured in Examples 32 to 38 and Comparative Example 10 were measured in the same manner as in Examples 1 to 4. The results obtained are shown in FIG. 7.

Figure 7:
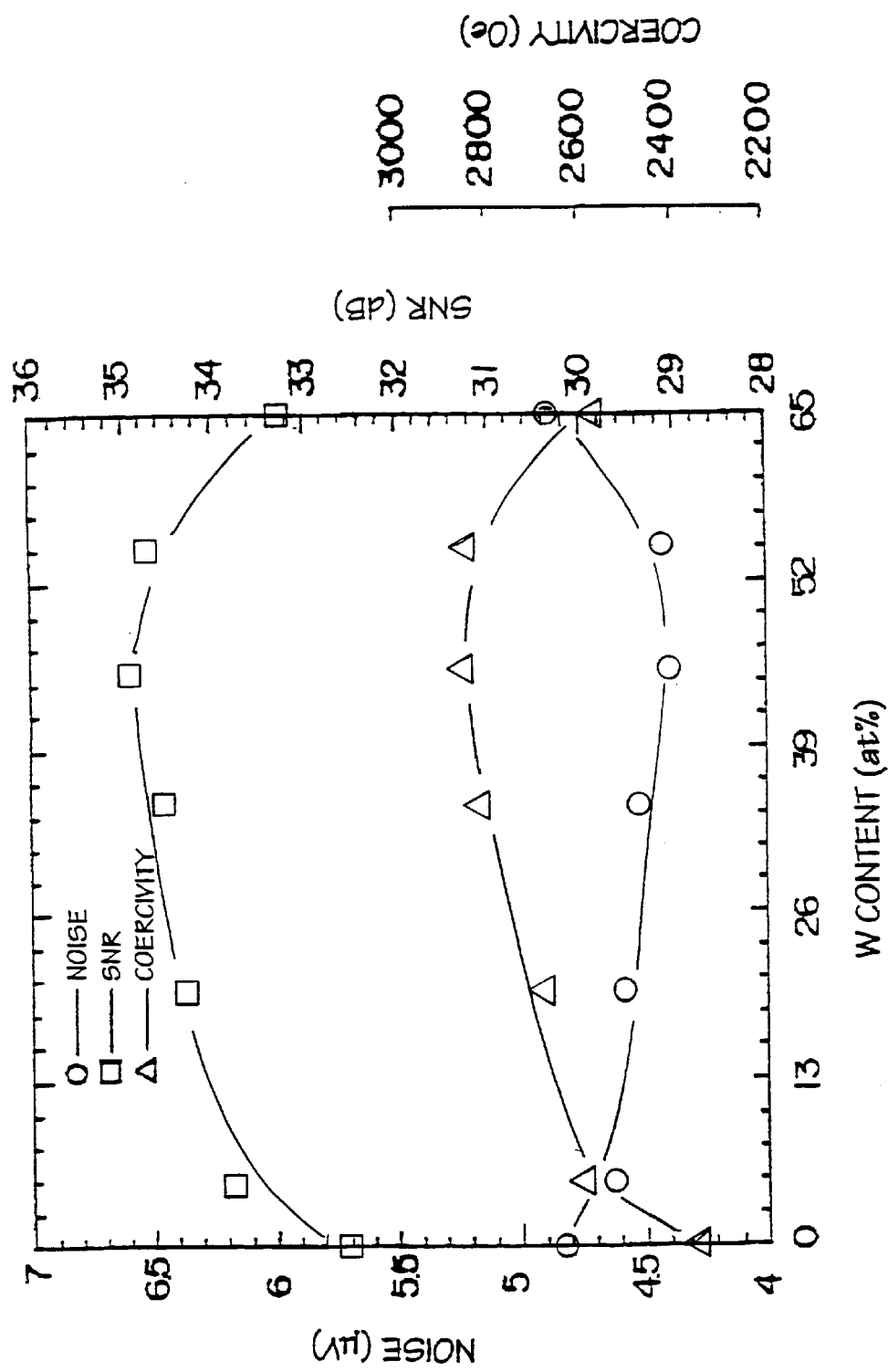
FIG. 7 is a graph showing test results.

In FIG. 7, the abscissa shows the W content of the second undercoat film 2B and the ordinate shows SNR (dB), noise ($\mu$V) or coercivity (Oe).

In FIG. 7, the case where the W content of the second undercoat film 2B is 0 at % is Comparative Example 10.

Examples 39 to 45

Magnetic recording media were manufactured in the same manner as in Examples 28 to 31, except for forming a second undercoat film 2B made of a Cr/V-base alloy.

Seven kinds of Cr/V-base alloys each comprising Cr and V were used having a component ratio (at %) of $Cr_{98}V_2$, $Cr_{94}V_6$, $Cr_{85}V_{15}$, $Cr_{80}V_{20}$, $Cr_{75}V_{25}$, $Cr_{70}V_{30}$ or $Cr_{65}V_{35}$ to prepare the magnetic media of Examples 39 to 45, respectively.

Comparative Example 11

A magnetic recording medium was manufactured in the same manner as in Examples 39 to 45, except for forming a second undercoat film 2B made of Cr in place of a Cr/V-base alloy.

The coercivity and read/write properties of the magnetic recording media manufactured in Examples 39 to 45 and Comparative Example 11 were measured in the same manner as in Examples 1 to 4. The results obtained are shown in FIG. 8.

Figure 8:
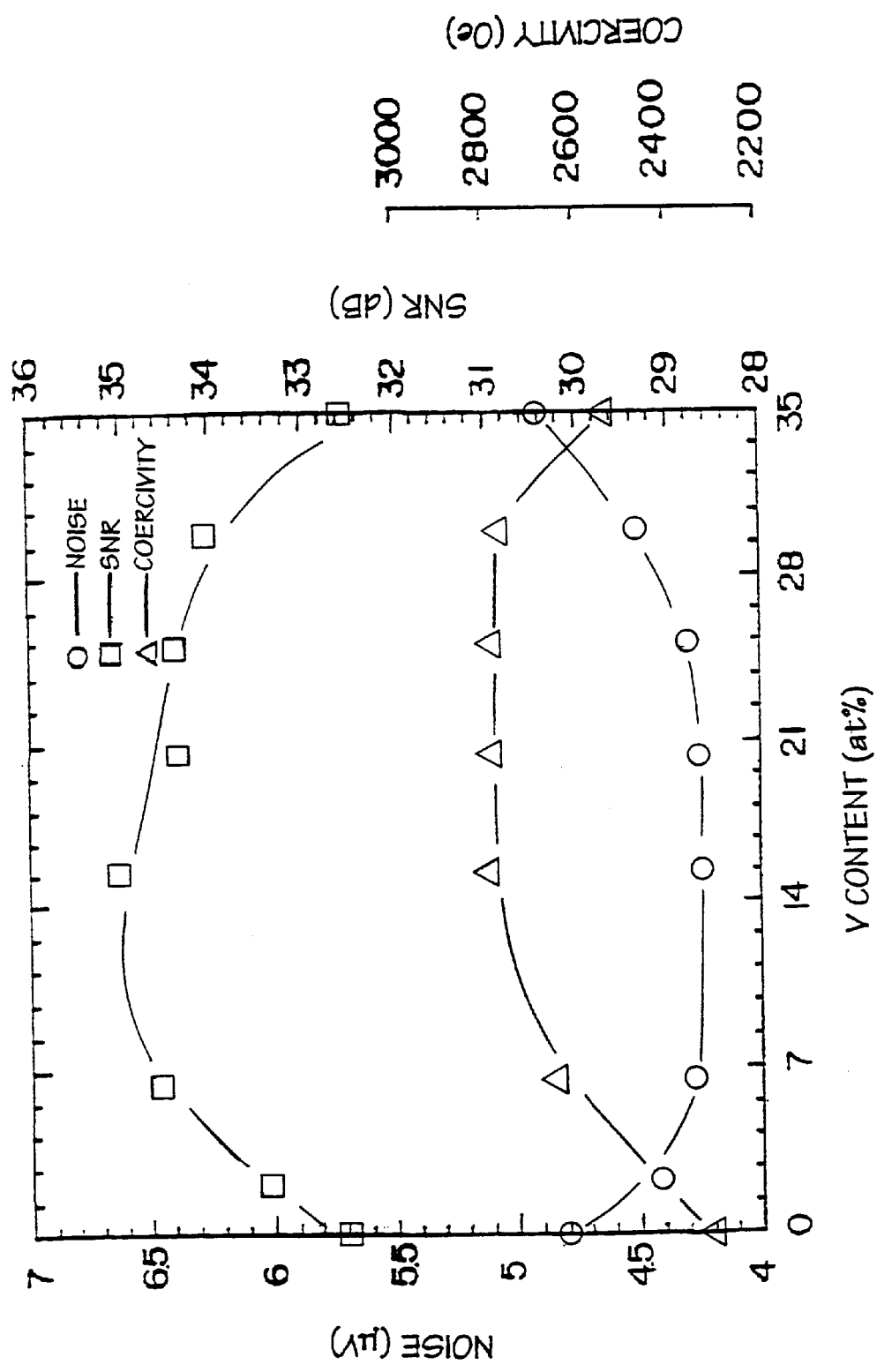
FIG. 8 is a graph showing test results.

In FIG. 8, the abscissa shows the V content of the second undercoat film 2B and the ordinate shows SNR (dB), noise ($\mu$V) or coercivity (Oe).

In FIG. 8, the case where the V content of the second undercoat film 2B is 0 at % is Comparative Example 11.

Examples 46 to 50

Magnetic recording media were manufactured in the same manner as in Examples 28 to 31, except for forming a second undercoat film 2B made of a Cr/Mo-base alloy.

Seven kinds of Cr/Mo-base alloys each comprising Cr and Mo were used having a component ratio (at %) of $Cr_{95}Mo_5$, $Cr_{90}Mo_{10}$, $Cr_{85}Mo_{15}$ $Cr_{80}Mo_{20}$ or $Cr_{75}Mo_{25}$ to prepare the magnetic media of Examples 46 to 50, respectively.

Comparative Example 12

A magnetic recording medium was manufactured in the same manner as in Examples 46 to 50, except for forming a second undercoat film 2B made of Cr in place of a Cr/Mo-base alloy.

The coercivity and read/write properties of the magnetic recording media manufactured in Examples 46 to 50 and Comparative Example 12 were measured in the same manner as in Examples 1 to 4. The results obtained are shown in FIG. 9.

Figure 9:
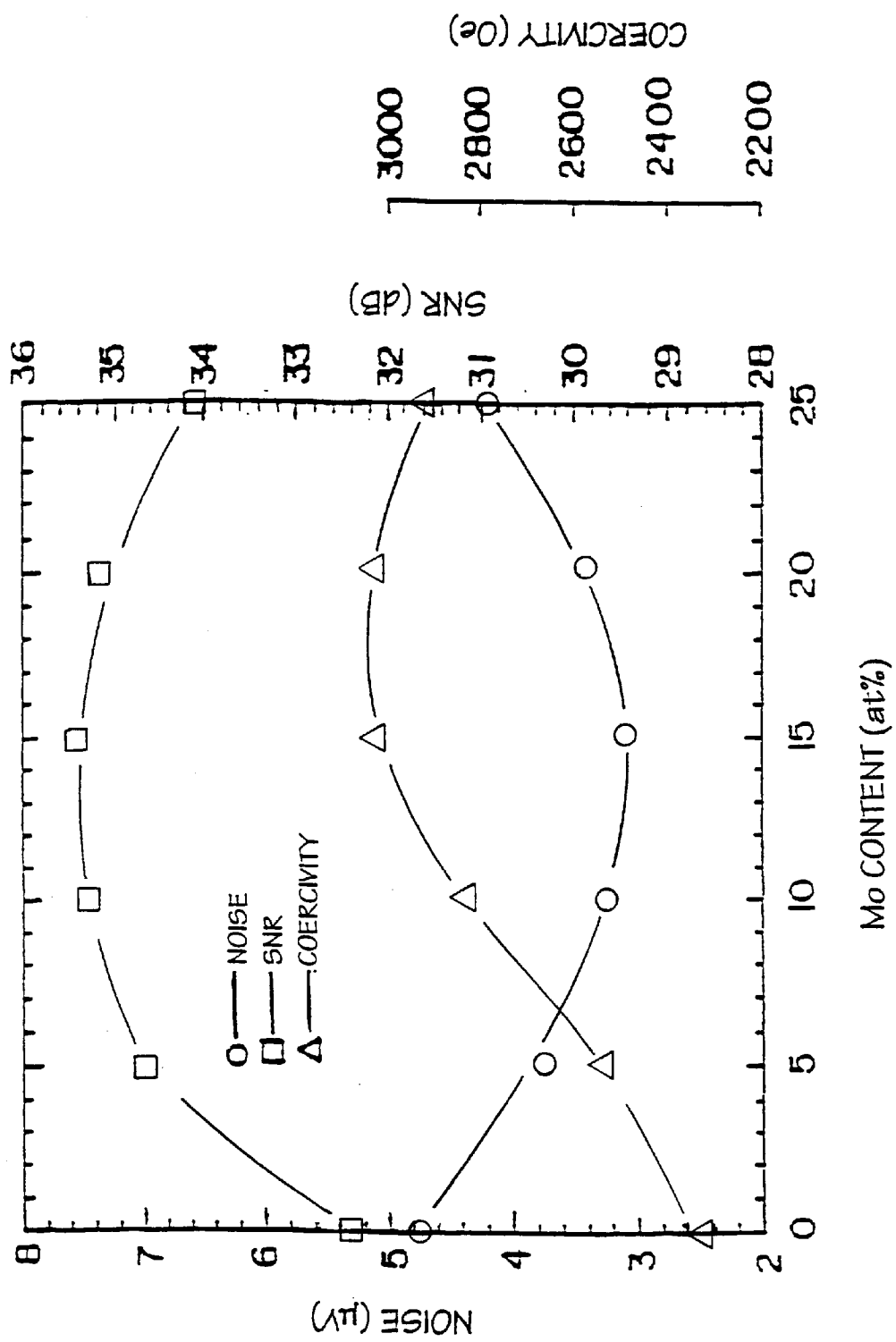
FIG. 9 is a graph showing test results.

In FIG. 9, the abscissa shows the Mo content of the second undercoat film 2B and the ordinate shows SNR (dB), noise ($\mu$V) or coercivity (Oe).

In FIG. 9, the case where the Mo content of the second undercoat film 2B is 0 at % is Comparative Example 12.

Examples 51 to 54

Magnetic recording media were manufactured by forming a second undercoat film 2B made of a Cr/Nb-base alloy (component ratio: $Cr_{95}Nb_5$), a Cr/W-base alloy (component ratio: $Cr_{85}W_{15}$), a Cr/V-base alloy (component ratio: $Cr_{85}V_{15}$) or a Cr/Mo-base alloy (component ratio: $Cr_{85}Mo_{15}$) to a thickness of 30 Å.

Comparative Examples 13 to 16

Magnetic recording media were manufactured in the same manner as in Examples 51 to 54, except for not forming a first undercoat film 2A.

The coercivity and read/write properties of the magnetic recording media manufactured in Examples 51 to 54 and Comparative Examples 13 to 16 were measured in the same manner as in Examples 1 to 4. The results obtained are shown in Table 2.

TABLE 2

| | Non-Magnetic Undercoat Film | Noise ($\mu$V) | SNR (dB) |
|---|---|---|---|
| Example 51 | 2-layer structure | 3.71 | 34.8 |
| Comparative Example 13 | single layer structure | 5.12 | 32.1 |
| Example 52 | 2-layer structure | 4.66 | 33.6 |
| Comparative Example 14 | single layer structure | 4.95 | 31.9 |
| Example 53 | 2-layer structure | 4.36 | 34.9 |
| Comparative Example 15 | single layer structure | 4.91 | 32.2 |
| Example 54 | 2-layer structure | 3.38 | 35.5 |
| Comparative Example 16 | single layer structure | 4.76 | 32.5 |

It is seen from FIG. 2 and FIG. 6 that the magnetic recording media of Examples 1 to 3 and Examples 28 to 31 where the second undercoat film 2B of the non-magnetic undercoat 2 was made of a Cr/Nb-base alloy and the Nb content of the second undercoat film 2B was from 5 to 20 at %, provided excellent noise properties and high coercivity as compared with the magnetic recording medium of Comparative Example 1 and Comparative Example 9.

Also, it is seen from FIG. 3 and FIG. 7 that the magnetic recording media of Examples 5 to 10 and Examples 32 to 38 where the second undercoat film 2B of the non-magnetic undercoat film 2 was made of a Cr/W-base alloy and the W content of the second undercoat film 2B was from 5 to 60 at %, provided excellent noise properties as compared with the magnetic recording medium of Comparative Example2 and Comparative Example 10. In particular, the magnetic recording media of Examples 8 to 10 and Example 35 to 37 where the W content of the second undercoat film 2B was from 30 to 60 at % provided both excellent noise properties and high coercivity.

It is seen from FIG. 4 and FIG. 8 that the magnetic recording media of Examples 12 to 17 and Examples 39 to 44 where the second undercoat film 2B of the non-magnetic undercoat film 2 was made of a Cr/V-base alloy and the V content of the second undercoat film 2B was from 2 to 30 at %, provided excellent noise properties and high coercivity as compared with the magnetic recording medium of Comparative Example 3 and Comparative Example 11.

It is seen from FIG. 5 and FIG. 9 that the magnetic recording media of Examples 19 to 23 and Examples 46 to 50 where the second undercoat film 2B of the non-magnetic undercoat film 2 was made of a Cr/Mo-base alloy and the Mo content of the second undercoat film 2B was from 2 to 25 at %, provided excellent noise properties and high coercivity as compared with the magnetic recording medium of Comparative Example 4 and Comparative Example 12.

Furthermore, it is seen from Table 1 and Table 2 that the magnetic recording media of Examples 24 to 27 and Examples 51 to 54 where the non-magnetic undercoat film 2 had a two-layer structure including a first undercoat film 2A and a second undercoat film 2B provided excellent noise properties as compared with the magnetic recording media of Comparative Examples 5 to 8 and Comparative Examples 13 to 16 where the non-magnetic undercoat had a single layer structure.

As described above, the magnetic recording medium of the present invention provides both high coercivity and excellent noise properties.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic substrate having thereon a non-magnetic undercoat and a magnetic film, said magnetic film comprising a material containing Co as a main component, said non-magnetic undercoat comprising at least two layers including a first undercoat film and a second undercoat film provided on said first undercoat film, said first undercoat film comprising a material containing Cr as a main component, and said second undercoat film comprising a material selected from the group consisting of a Cr/Nb-base alloy, a Cr/W-base alloy, and a Cr/V-base alloy as a main component, provided that:

if the second undercoat film comprises Cr/Nb-base alloy as a main component, the Nb content of the second undercoat film is from 5 to 20 at %;

if the second undercoat film comprises Cr/W-base alloy as a main component, the W content of the second undercoat film is from 5 to 60 at %; and if the second undercoat film comprises Cr/V-base alloy as a main component, the V content of the second undercoat film is from 2 to 30 at %.

2. The magnetic recording medium as claimed in claim 1, wherein said first undercoat film has a thickness of from 25 to 600 Å.

3. The magnetic recording medium as claimed in claim 1, wherein said first undercoat film consists essentially of Cr and said second undercoat film consists essentially of a Cr/Nb-base alloy having an Nb content of from 5 to 20 at %, a Cr/W-base alloy having a W content of from 5 to 60 at %, or a Cr/V-base alloy having a V content of from 2 to 30 at %.

4. The magnetic recording medium as claimed in claim 1, wherein the W content of said second undercoat film is from 30 to 60 at % when said second undercoat film comprises Cr/W-base alloy as a main component.

5. The magnetic recording medium as claimed in claim 1, wherein said first undercoat film consists essentially of Cr.

6. The magnetic recording medium as claimed in claim 1, wherein said first undercoat film has a composition that is different from that of said second undercoat film.

7. The magnetic recording medium as claimed in claim 1, wherein said first undercoat film has a thickness of from 25 to 600 Å.

8. The magnetic recording medium as claimed in claim 1, wherein said second undercoat film has a thickness of from 1 to 200 Å.

9. The magnetic recording medium as claimed in claim 1, wherein said non-magnetic substrate comprises an aluminum alloy having a NiP plating layer applied to the surface thereof.

10. The magnetic recording medium as claimed in of claim 1, wherein said non-magnetic substrate comprises glass.

11. The magnetic recording medium as claimed in claim 1, wherein said non-magnetic undercoat has a two-layer structure.

12. The magnetic recording medium as claimed in claim 1, comprising a non-magnetic substrate having thereon a non-magnetic undercoat and a magnetic film in this order.

13. The magnetic recording medium as claimed in claim 1, further comprising a protective layer provided on said magnetic film.

14. The magnetic recording medium as claimed in claim 13, comprising a non-magnetic substrate having thereon a non-magnetic undercoat, a magnetic film and a protective layer in this order.

15. A magnetic recording medium comprising a non-magnetic substrate having thereon a non-magnetic undercoat, a magnetic film and a protective film in this order, said magnetic film comprising a material containing Co as a main component, said non-magnetic undercoat having a two layer structure including a first undercoat film having a thickness of from 25 to 600 Å and a second undercoat film having a thickness of from 1 to 200 Å provided on said first undercoat film, said first undercoat film comprising a material containing Cr in a ratio of 50 at % or more, said second undercoat film comprising a material selected from the group consisting of a Cr/Nb-base alloy, a Cr/W-base alloy, and a Cr/V-base alloy as a main component, provided that:

if the second undercoat film comprises Cr/Nb-base alloy as a main component, the Nb content of the second undercoat film is from 5 to 20 at %;

if the second undercoat film comprises Cr/W-base alloy as a main component, the W content of the second undercoat film is from 5 to 60 at %; and if the second undercoat film comprises Cr/V-base alloy as a main component, the V content of the second undercoat film is from 2 to 30 at %.

16. The magnetic recording medium as claimed in claim 15, wherein said first undercoat film consists essentially of Cr.

17. The magnetic recording medium as claimed in claim 15, wherein said first undercoat film consists essentially of Cr and said second undercoat film consists essentially of a Cr/Nb-base alloy having an Nb content of from 5 to 20 at %, a Cr/W-base alloy having a W content of from 5 to 60 at %, or a Cr/V-base alloy having a V content of from 2 to 30 at %.

18. The magnetic recording medium as claimed in claim 1 or 15, wherein said magnetic recording medium has a magnetic coercive force of greater than 2,480 Oersteds.

* * * * *